United States Patent
Ohi et al.

(10) Patent No.: US 10,639,853 B2
(45) Date of Patent: May 5, 2020

(54) THREE-DIMENSIONAL OBJECT, THREE-DIMENSIONAL SHAPING APPARATUS, AND THREE-DIMENSIONAL SHAPING METHOD

(71) Applicant: MIMAKI ENGINEERING CO., LTD., Nagano (JP)

(72) Inventors: Hiroyoshi Ohi, Nagano (JP); Kazuhiro Ochi, Nagano (JP); Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 376 days.

(21) Appl. No.: 15/372,403

(22) Filed: Dec. 8, 2016

(65) Prior Publication Data

US 2017/0165919 A1 Jun. 15, 2017

(30) Foreign Application Priority Data

Dec. 11, 2015 (JP) ................................. 2015-241803

(51) Int. Cl.
*B29C 67/00* (2017.01)
*H04N 1/58* (2006.01)
(Continued)

(52) U.S. Cl.
CPC ........ *B29C 67/0088* (2013.01); *B29C 64/171* (2017.08); *B29C 64/386* (2017.08);
(Continued)

(58) Field of Classification Search
CPC .... B29C 64/171; B33Y 10/00; B29L 2009/00
(Continued)

(56) References Cited

U.S. PATENT DOCUMENTS

2002/0079601 A1* 6/2002 Russell .................. B29C 41/12
264/40.1
2015/0183160 A1* 7/2015 Ohnishi ................. B33Y 10/00
264/129

(Continued)

FOREIGN PATENT DOCUMENTS

JP 2000280256 10/2000
JP 2008302701 12/2008

OTHER PUBLICATIONS

"Office Action of Japan Counterpart Application", dated Feb. 25, 2019, with English translation thereof, p. 1-p. 5.

*Primary Examiner* — Betelhem Shewareged
(74) *Attorney, Agent, or Firm* — JCIPRNET

(57) ABSTRACT

A three-dimensional object that maintains a satisfactory visual color quality when the object is observed at different positions or through different angles, and a three-dimensional shaping apparatus for and a three-dimensional shaping method of shaping such a three-dimensional object are provided. The three-dimensional object includes: a shaping base having a first and second outer surfaces adjacent to each other at an adjacent angle; a first colored layer formed on the first outer surface and including a transparent material colored in a first color; a second colored layer formed on the second outer surface and including a transparent material colored in a second color different from the first color; and a partition layer interposed between the side surfaces of the first colored layer and the second colored layer. The partition layer is opaque and has one of the first color, the second color, and an achromatic color.

11 Claims, 9 Drawing Sheets

(51) Int. Cl.
    *B29C 64/386*     (2017.01)
    *B29C 64/171*     (2017.01)
    *B33Y 80/00*     (2015.01)
    B29L 9/00     (2006.01)
    B33Y 10/00     (2015.01)
    B33Y 30/00     (2015.01)
    B33Y 50/02     (2015.01)

(52) U.S. Cl.
    CPC ................ *B33Y 80/00* (2014.12); *H04N 1/58* (2013.01); *B29K 2995/002* (2013.01); *B29K 2995/0025* (2013.01); *B29K 2995/0026* (2013.01); *B29L 2009/00* (2013.01); *B33Y 10/00* (2014.12); *B33Y 30/00* (2014.12); *B33Y 50/02* (2014.12)

(58) Field of Classification Search
    USPC ...................................................... 428/195.1
    See application file for complete search history.

(56) References Cited

U.S. PATENT DOCUMENTS

2015/0273520 A1* 10/2015 Okamoto ............... B41J 2/0456
    428/172
2015/0314534 A1* 11/2015 Yakubov ................ B33Y 10/00
    264/401
2017/0165919 A1* 6/2017 Ohi ....................... B29C 64/386

* cited by examiner

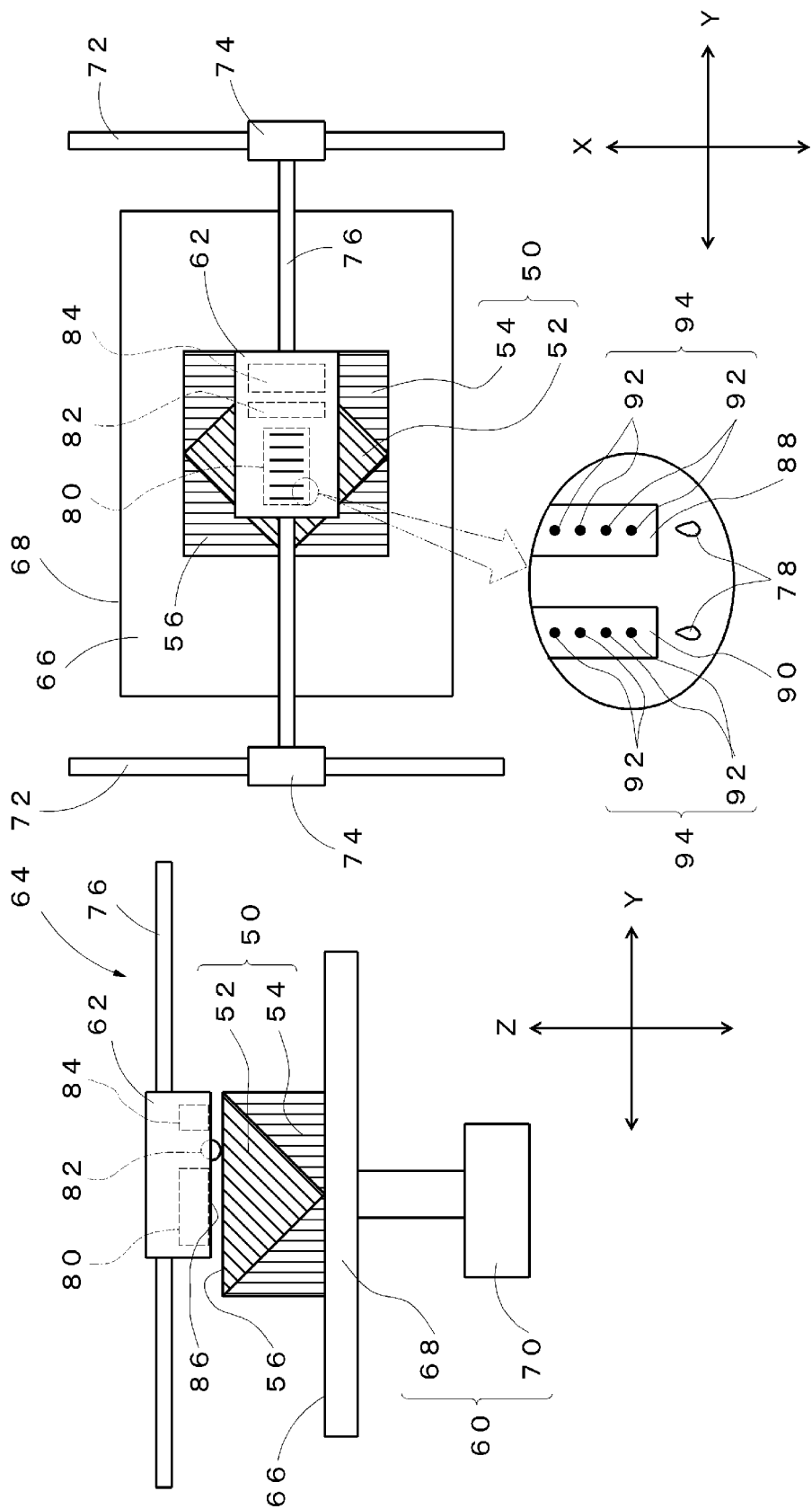

THREE-DIMENSIONAL OBJECT, THREE-DIMENSIONAL SHAPING APPARATUS, AND THREE-DIMENSIONAL SHAPING METHOD

CROSS REFERENCE TO RELATED APPLICATIONS

This application claims the priority benefit of Japanese Patent Application No. 2015-241803, filed on Dec. 11, 2015. The entirety of the above-mentioned patent application is hereby incorporated by reference herein and made a part of this specification.

BACKGROUND

Technical Field

This disclosure relates to a three-dimensional object colored on at least outermost surfaces thereof, and a three-dimensional shaping apparatus for and a three-dimensional shaping method of shaping such a three-dimensional object.

Related Art

In recent times, three-dimensional shaping apparatuses have been developed (generally called, 3D printers). These apparatuses are configured to shape a three-dimensional object by stacking slices of a material in layers (hereinafter, unit layers) while solidifying the material per slice. Thus far have been disclosed various techniques for coloring the outermost surfaces of such a shaped object.

Japanese Unexamined Patent Publication No. 2000-280256 ([0055], and FIGS. 4A to 4D describes a three-dimensional shaping apparatus equipped with nozzles for shaping and coloring. A resin to be shaped is discharged through the shaping nozzle, and colorants having different colors are discharged through the coloring nozzles. This literature further describes a three-dimensional object in which a colored region is formed on the inner side by a predetermined width with respect to the outermost surfaces to avoid exposure of any inner uncolored portion.

SUMMARY

The inventors of this application have found the following fact through their studies. When an observer looks at a three-dimensional object from the side of an outermost surface having a color, another color of a different outermost surface is possibly mixed with the color and then perceived by the observer's eye. Such color mixture may attract the observer's attention particularly when he/she looks at the vicinity of an apex defined by two outermost surfaces, because the path length of light passing through the three-dimensional object is relatively short in the apex vicinity, inviting the observer to simultaneously perceive color components of the different outermost surfaces.

However, Japanese Unexamined Patent Publication No. 2000-280256 ([0055], and FIGS. 4A to 4D is totally silent about the color mixture and the resulting issue. The observer, looking at the three-dimensional object described in Japanese Unexamined Patent Publication No. 2000-280256 ([0055], and FIGS. 4A to 4D, may feel uncomfortable with local color differences on the outermost surfaces of this object.

To address the issue, this disclosure is directed at providing a three-dimensional object that maintains a satisfactory visual color quality when the object is observed at different positions or through different angles, and a three-dimensional shaping apparatus for and a three-dimensional shaping method of shaping such a three-dimensional object.

"A three-dimensional object" disclosed herein includes: a shaping base having a first outer surface and a second outer surface adjacent to each other at an adjacent angle; a first colored layer formed on the first outer surface of the shaping base, the first colored layer including a transparent material colored in a first color; a second colored layer formed on the second outer surface of the shaping base, the second colored layer including a transparent material colored in a second color different from the first color, and a partition layer interposed between a side surface of the first colored layer and a side surface of the second colored layer, the partition layer being opaque and having one of the first color, the second color, and an achromatic color.

By interposing the opaque partition layer having the achromatic or second color between the side surfaces of the first colored layer and the second colored layer, incident light through the first colored layer from the outside of the three-dimensional object may be less likely to transmit through or prevented from transmitting through the second colored layer and exiting from the object. Further, incident light through the second colored layer from the outside may be reflected from the partition layer having a substantially uniform spectral reflectance within a visible light region or a spectral reflectance similar to that of the second colored layer. This may deliver a light-shielding effect that prevents perception of color components of the first colored layer and/or partition layer when an observer looks at the second colored layer of the three-dimensional object. As a result, the object may maintain a satisfactory visual color quality when observed at different positions or through different angles. The object may likewise maintain a satisfactory visual color quality as per the same principle when the first colored layer of the three-dimensional object is observed.

Preferably, the side surface of the first colored layer makes a surface contact with the side surface of the second colored layer at a contact portion on an outer side in a thickness direction, and the partition layer is disposed on an inner side in the thickness direction with respect to the contact portion. This may prevent exposure of the partition layer that differ in color from the first colored layer or the second colored layer, allowing the three-dimensional object to maintain a satisfactory visual appearance.

Preferably, the partition layer has a lower light transmittance than the first colored layer and the second colored layer. This may increase the light-shielding effect exerted by the partition layer.

Preferably, the partition layer has a higher light transmittance as the adjacent angle has a greater degree. Greater adjacent angles are inclined to conduce to a greater range of angles through which the partition layer is visible from the outside (hereinafter, visibility angle). In the light of this fact, the light transmittance of the partition layer may be increased with greater degrees of the adjacent angle. This may decrease the quantity of light reflected from the surface of the partition layer, consequently making the partition layer barely visually recognizable from the outside of the three-dimensional object.

Preferably, the partition layer is provided only where the adjacent angle has a degree less than a threshold. Greater adjacent angles may be prone to the following two outcomes; longer path length of light traversing the apex vicinity of the three-dimensional object, and greater visibility angles of the partition layer. Taking these possible outcomes into consideration, the partition layer possibly visible from the outside may be omitted, if unneeded. This may prevent that the three-dimensional object is degraded in visual appearance on the contrary to expectation.

Preferably, the first outer surface and the second outer surface have an opaque achromatic color. This may allow the first colored layer and the second colored layer to exhibit their colors as desired when these colored layers are observed from the outer periphery of the shaping base.

"A three-dimensional shaping apparatus" disclosed herein is configured to shape a three-dimensional object by vertically stacking unit layers on one another that includes a plurality of different shaping materials that enable color reproduction of at least a first color and a second color different from the first color. The three-dimensional object shaped includes: a shaping base having a first outer surface and a second outer surface adjacent to each other at an adjacent angle; a first colored layer formed on the first outer surface of the shaping base, the first colored layer including a transparent material colored in the first color, and a second colored layer formed on the second outer surface of the shaping base, the second colored layer including a transparent material colored in the second color. The apparatus has: a data obtaining unit that obtains color shaping data representing an original colored object including the shaping base, the first colored layer, and the second colored layer; and a data correcting unit that corrects the color shaping data obtained by the data obtaining unit to interpose a partition layer between a side surface of the first colored layer and a side surface of the second colored layer in the original colored object, the partition layer being opaque and having one of the first color, the second color, and an achromatic color.

"A three-dimensional shaping method" is a method of shaping a three-dimensional object by stacking unit layers on one another using a three-dimensional shaping apparatus, the unit layers including a plurality of different shaping materials that enable color reproduction of at least a first color and a second color different from the first color. The three-dimensional object includes: a shaping base having a first outer surface and a second outer surface adjacent to each other at an adjacent angle; a first colored layer formed on the first outer surface of the shaping base, the first colored layer including a transparent material colored in the first color; and a second colored layer formed on the second outer surface of the shaping base, the second colored layer including a transparent material colored in the second color. The method includes: an obtaining step of obtaining color shaping data representing an original colored object including the shaping base, the first colored layer, and the second colored layer; and a correcting step of correcting the color shaping data obtained in the obtaining step to interpose a partition layer between a side surface of the first colored layer and a side surface of the second colored layer in the original colored object, the partition layer being opaque and having one of the first color, the second color, and an achromatic color.

The three-dimensional object disclosed herein may maintain a satisfactory visual color quality when observed at different positions or through different angles. The three-dimensional shaping apparatus and the three-dimensional shaping method disclosed herein may successfully shape such a three-dimensional object.

BRIEF DESCRIPTION OF DRAWINGS

FIGS. 5A and 5B are drawings of the whole structure of a three-dimensional shaping apparatus used to shape the three-dimensional object illustrated in FIG. 1;

DETAILED DESCRIPTION

Hereinafter are described embodiments of a three-dimensional object disclosed herein referring to the accompanying drawings in connection with a three-dimensional shaping apparatus and a three-dimensional shaping method.

Description of Three-Dimensional Object 10

1. Structure of Three-Dimensional Object 10

Figure 1:
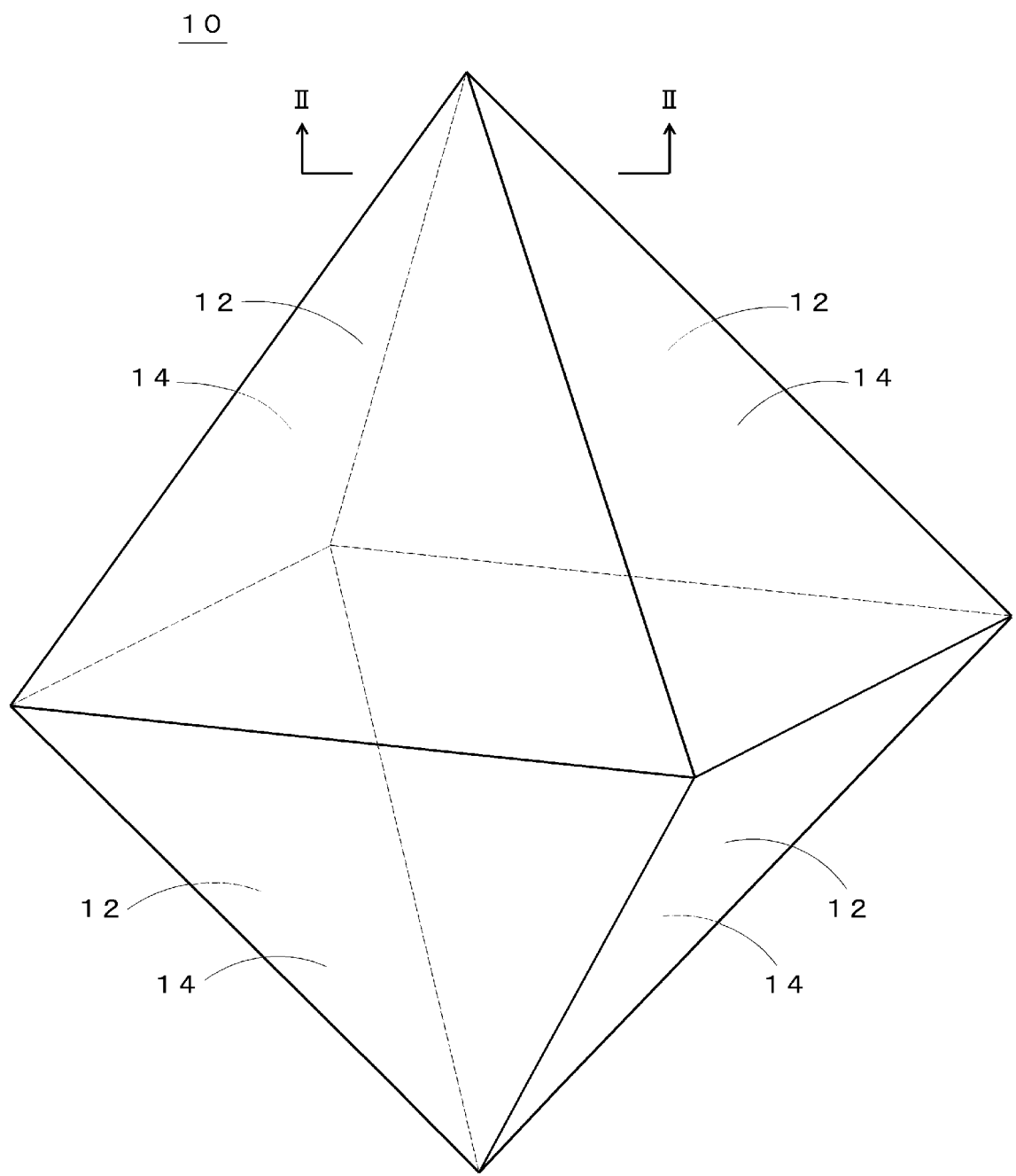
FIG. 1 is a perspective view of a three-dimensional object according to an embodiment of the present disclosure.
Figure 2:
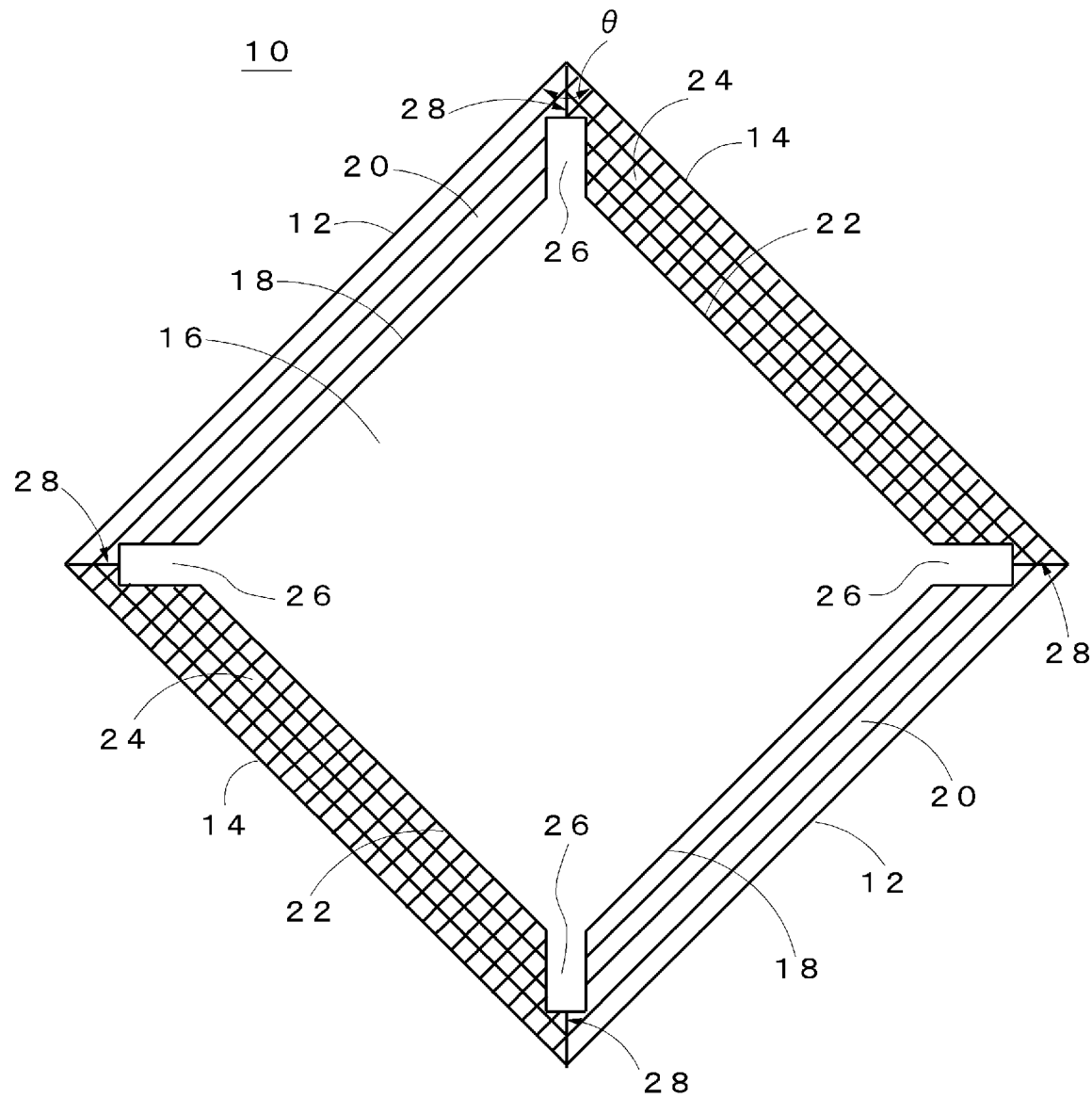
FIG. 2 is an enlarged cross-sectional view taken along II-II line in FIG. 1.
Figure 3:
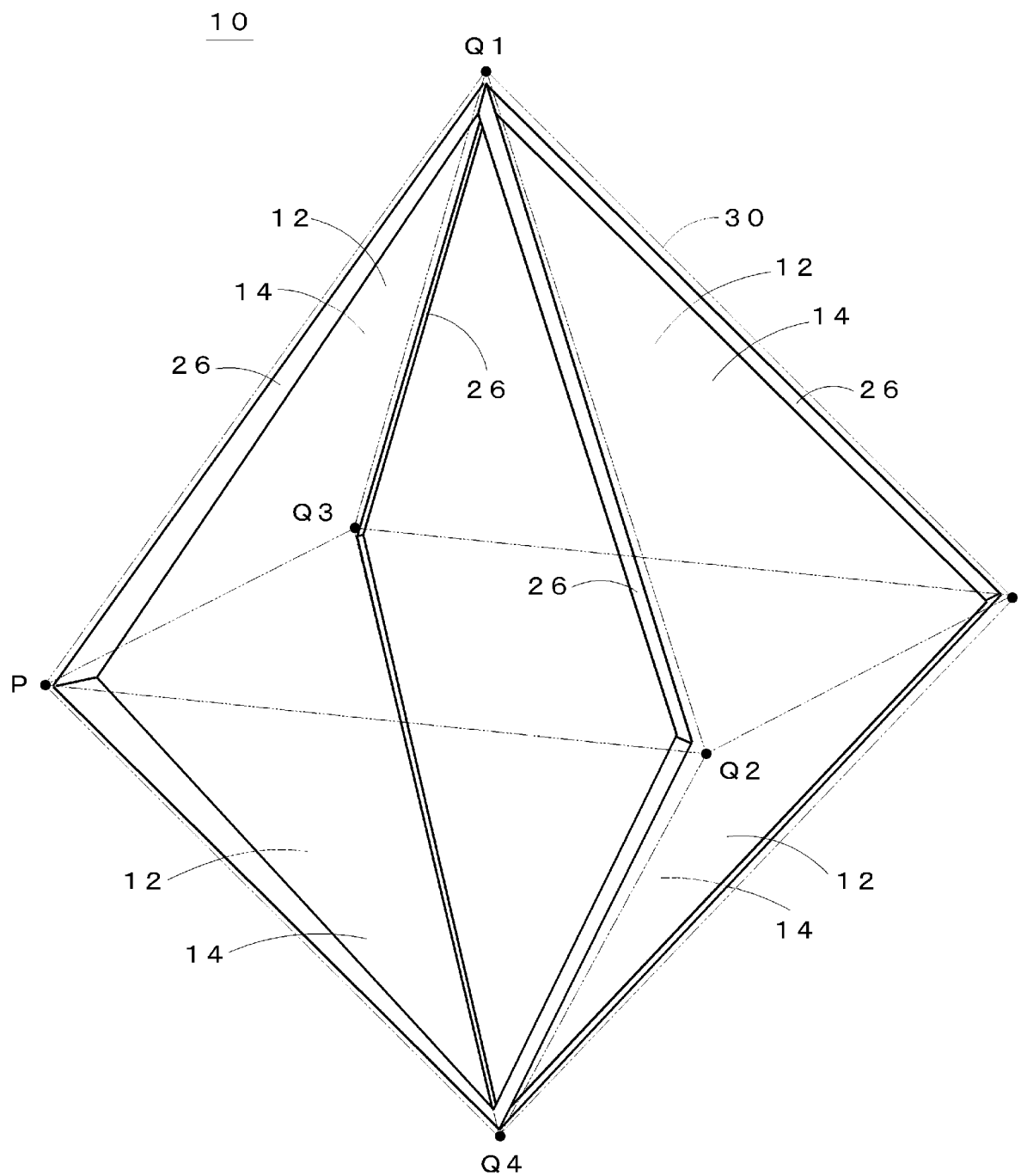
FIG. 3 is a schematic perspective view of the three-dimensional object illustrated in FIG. 1.

FIG. 1 is a perspective view of a three-dimensional object 10 according to an embodiment of this disclosure. FIG. 2 is an enlarged cross-sectional view taken along II-II line in FIG. 1. FIG. 3 is a schematic perspective view of the three-dimensional object 10 illustrated in FIG. 1.

As illustrated in FIG. 1, the three-dimensional object 10 is an object having a shape with an aspect ratio slightly changed from that of a regular octahedron. This object has four outermost surfaces 12 in the shape of an equilateral triangle. These outermost surfaces 12 are colored in a first color (for example, red). This object further has four outermost surfaces 14 in the shape of an equilateral triangle. These outermost surfaces 14 are colored in a second color different from the first color (for example, blue). Thus, the three-dimensional object 10 is decorated in two colors; red and blue, so as to have its adjacent outermost surfaces 12 and 14 differ in color.

As illustrated in FIG. 2, the three-dimensional object 10 includes a shaping base 16 as its base, one or a plurality of first colored layers 20 formed on one or a plurality of first outer surfaces 18, one or a plurality of second colored layers 24 formed on one or a plurality of second outer surfaces 22, and a partition layer(s) 26 interposed between the first and second colored layers 20 and 24. Both or either one of the first and second outer surfaces 18 and 22 may be a flat surface or a curved surface.

The shaping base 16, first colored layers 20, second colored layers 24, and partition layers 26 are made of a material curable through a physical treatment or a chemical treatment. Examples of the material may include photocurable resins and thermosetting resins. In case of using an ultraviolet-curable resin cured by being irradiated with ultraviolet (UV) light, examples of such a resin may include radical polymerization UV-curable resins cured by initiating radical polymerization reactions, and cationic polymerization UV-curable resins cured by initiating cationic polymerization reactions. Examples of the radical polymerization UV-curable resins may include urethane acrylate, acrylic acrylate, and epoxy acrylate.

The shape of the shaping base 16 is substantially a regular octahedron similarly to the three-dimensional object 10. The shaping base 16 has four sets of first outer surfaces 18 and second outer surfaces 22 respectively adjacent to each other at an adjacent angle θ. At least the first outer surfaces 18 and the second outer surfaces 22 of the shaping base 16 are colored in a color or made of a material that differ from the colors or materials of the first and second colored layers 20 and 24. The first outer surfaces 18 and the second outer surfaces 22 may preferably have an opaque achromatic color or white color. This may allow the first colored layers 20 and the second colored layers 24 to exhibit their colors as desired when these colored layers are observed from the outer periphery of the shaping base 16.

The "opaque" means no transparency to light, and more particularly means that "the total luminous transmittance of plastics" set forth in JIS K7375: 2008 is less than or equal to 20% (optical density of 0.7 D or more). The "achromatic" means "achromatic as strictly defined" with zero saturation (S) in the HLS color system, and may further mean "substantially achromatic" with very low saturation (substantially 10% or less).

The first colored layer 20 includes a transparent material colored in the first color and covers the whole of the corresponding first outer surface 18 in a certain thickness. The second colored layer 24 includes a transparent material colored in the second color and covers the whole of the corresponding second outer surface 22 in a certain thickness. In a case where the shaping base 16 has an adequately large size, the thicknesses of the first colored layer 20 and the second colored layer 24 may range from 50 to 1,000 μm, and may preferably range from 200 to 500 μm.

The side surface of the first colored layer 20 makes a surface contact with the side surface of the adjacent second colored layer 24 at a contact portion 28 closer to the outermost surface 12 (outer side in the thickness direction). The partition layer 26 integral with the shaping base 16 is disposed at a position closer to the first outer surface 18 with respect to the contact portion 28 (inner side in the thickness direction). The partition layer 26 has an opaque achromatic color, for example, a white color like the shaping base 16.

The partition layer 26 is made of a material having a relatively low light transmittance. The partition layer 26 has, therefore, a lower light transmittance than the first colored layer 20 and the second colored layer 24. The partition layer 26 has a relatively large thickness. This, in addition to or apart from the material used, may lower the light transmittance of the partition layer 26 as compared to the first colored layer 20 and the second colored layer 24.

As illustrated in FIG. 3, four partition layers 26 are formed along ridges 30 of the three-dimensional object 10 (illustrated with two-dot lines) on the slightly inner side of the ridges 30. The partition layer 26 is formed in a band-like shape having a certain width and is bent in a substantially L shape at an intermediate position in a lengthwise direction thereof. The four partition layers 26 are connected to one another at one ends and the other ends thereof.

References signs Q1, Q2, Q3, and Q4 respectively refer to apexes adjacent to an apex P. Then, an adjacent angle θ between a plane Q1PQ2 constituting the outermost surface 12 and a plane Q1PQ3 constituting the outermost surface 14 is 90 degrees (θ=90 degrees), and an adjacent angle θ between the plane Q1PQ2 constituting the outermost surface 12 and a plane Q3PQ4 constituting the outermost surface 14 is 120 degrees (θ=120 degrees).

The partition layer 26 is provided in accordance with the magnitude of the adjacent angle θ relative to a threshold θth (for example, 100 degrees). Specifically, the partition layer 26 is provided in vicinity of the ridges 30 (side PQ1, side PQ4) having the adjacent angle θ of 90 degrees, whereas the partition layer 26 is not provided in vicinity of the ridges 30 (side PQ2, side PQ3) having the adjacent angle θ of 120 degrees. Stated differently, the partition layer 26 is provided only where the adjacent angle θ has a degree less than the threshold θth.

2. Visual Features of Three-Dimensional Object 10

The three-dimensional object 10 according to this embodiment is structured as described above. The visual features of the three-dimensional object 10 illustrated in FIGS. 1 to 3 are hereinafter described referring to FIGS. 4A and 4B.

Figure 4A:
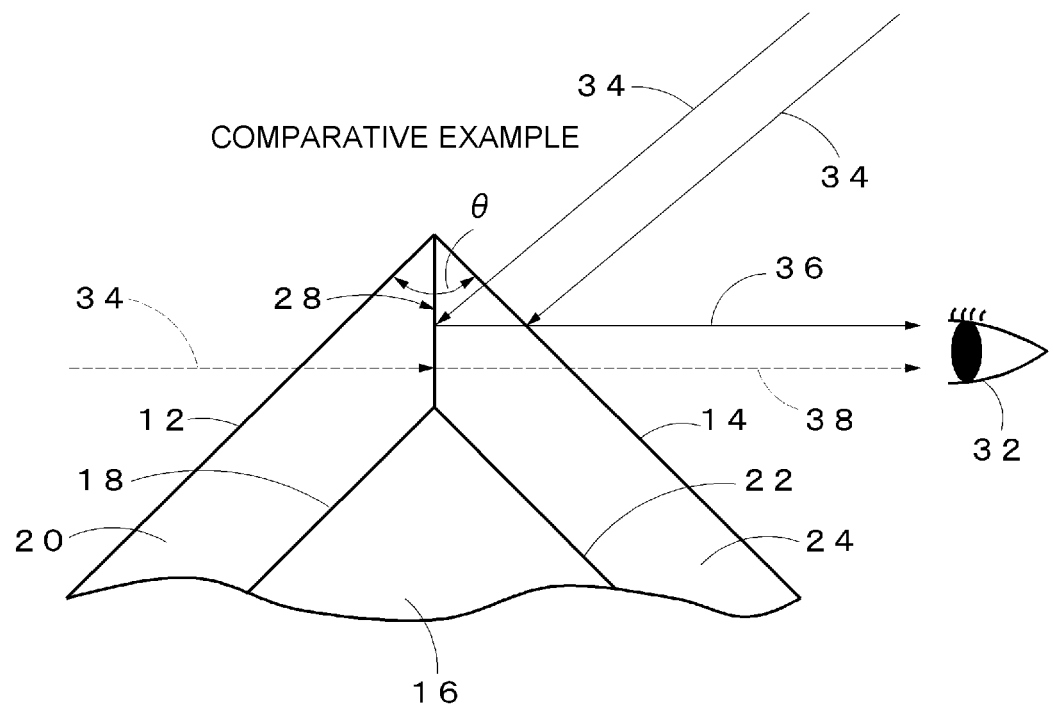
FIGS. 4A and 4B are schematic explanatory drawings of visual features of the three-dimensional object illustrated in FIGS. 1 to 3.

FIG. 4A is a schematic drawing, illustrating an optical phenomenon when an apex of an object having no partition layer 26 (conventional three-dimensional object) is observed from an outermost surface 14 side thereof. The observer perceives the color and the shape of this object based on the position distribution and spectral characteristics of natural light 34 received by an eye 32. For example, the natural light 34 entering through the outermost surface 14 is reflected from the outermost surface 14 or the contact portion 28, and then received as a reflected component 36 containing blue light in abundance.

In the meantime, optical paths traversing apexes or their vicinity are shorter than in any other portions. Further, the optical paths do not traverse the shaping base 16 having opacity (no transparency to light). The natural light 34 entering through the second colored layer 24 may be reflected from the contact portion 28 having an ununiform spectral reflectance within a visible light region. The reflected light may then be received as a reflected component 36 containing relatively less blue light. The natural light 34 entering through the outermost surface 12 may transmit through the first colored layer 20 and then transmit through the second colored layer 24. The transmitted light may then be received as a transmitted component 38 containing green light in abundance.

When the object thus positioned is observed from the outermost surface 14 side, the color of the outermost surface 12 may be mixed with the color of the outermost surface 14 and then perceived by the observer's eye. Specifically, the observer may perceive "blue color" in a region that has received the reflected component 36 alone, while perceiving "bluish green color" in a region that has received the reflected component 36 and the transmitted component 38 simultaneously. As a result, the observer may feel uncomfortable with such a local color difference on the outermost surface 14.

Figure 4B:
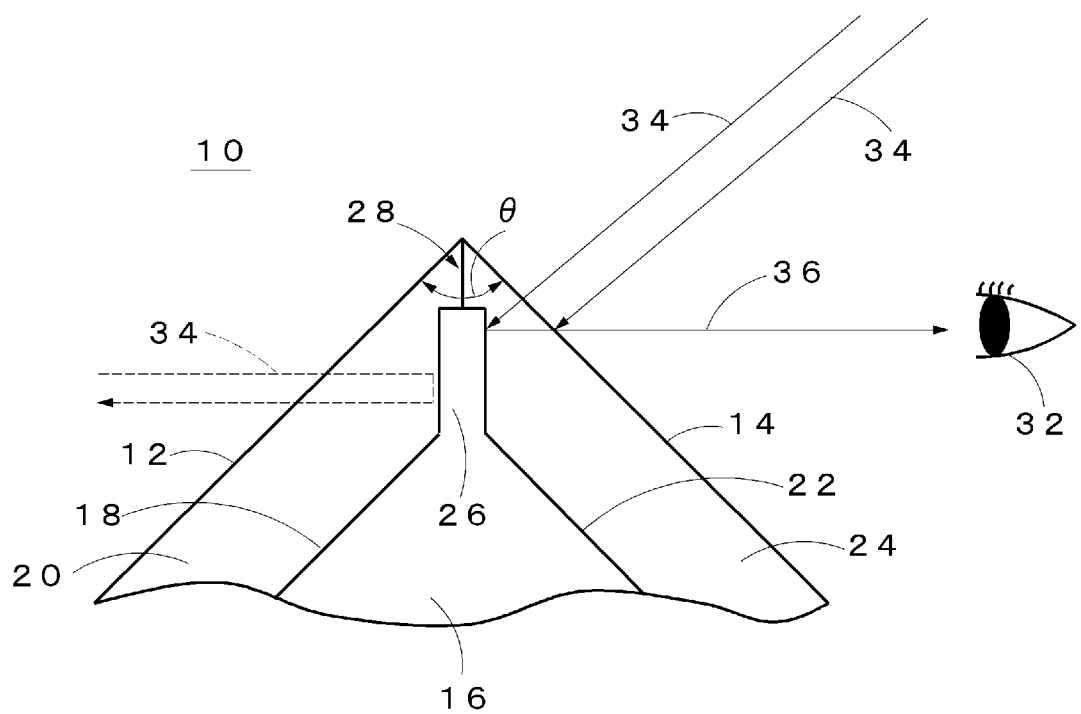

FIG. 4B is a schematic drawing, illustrating an optical phenomenon when an apex of the three-dimensional object 10 having the partition layers 26 is observed from an outermost surface 14 side thereof. Similarly to the object illustrated in FIG. 4A, the natural light 34 entering through the outermost surface 14 is received as the reflected component 36 containing blue light in abundance.

As is known from the drawing, the object 10 has the opaque achromatic partition layer 26 interposed between the optical paths traversing the apex or its vicinity. The natural light 34 entering through the second colored layer 24 may be reflected from the partition layer 26 having a substantially uniform spectral reflectance within a visible light region. The reflected light may then be received as the transmitted component 38 containing blue light in abundance. The natural light 34 entering through the outermost surface 12 may transmit through the first colored layer 20; however, the transmitted light may be entirely or mostly reflected from the partition layer 26.

This may deliver a light-shielding effect that prevents perception of color components of the first colored layer 20 and the partition layer 26 at the time of observing the second colored layer 24 of the three-dimensional object 10. Likewise, a light-shielding effect may be delivered that prevents perception of color components of the second colored layer 24 and the partition layer 26 at the time of observing the first colored layer 20 of the three-dimensional object 10. In this way, regardless of whether the observer is gazing at any one of the apexes, the whole region of the first colored layer 20 may appear "red", and the whole region of the second colored layer 24 may appear "blue" to the observer's eye.

3. Effects Attained by Three-Dimensional Object 10

As described so far, the three-dimensional object 10 includes: the shaping base 16 having the first outer surface(s) 18 and the second outer surface(s) 22 adjacent to each other at the adjacent angle θ; the first colored layer(s) 20 formed on the first outer surface(s) 18 of the shaping base 16 and including a transparent material colored in the first color; the second colored layer(s) 24 formed on the second outer surface 22 of the shaping base 16 and including a transparent material colored in the second color different from the first color; and the partition layer 26 interposed between the side surfaces of the first and second colored layers 20 and 24. The partition layer 26 is opaque and has an achromatic color with zero saturation or very low saturation.

By interposing the opaque achromatic partition layer 26 between the side surfaces of the first colored layer 20 and the second colored layer 24, the natural light 34 entering through the first colored layer 20 from the outside of the three-dimensional object 10 may be less likely to transmit through or prevented from transmitting through the second colored layer 24 and exiting from the object. Further, the natural light entering through the second colored layer 24 from the outside may be reflected from the partition layer 26 having a substantially uniform spectral reflectance within a visible light region. Then, the light-shielding effect thereby delivered prevents perception of color components of the first colored layer 20 and the partition layer 26 at the time of observing the second colored layer 24 of the three-dimensional object 10. As a result, the object 10 may maintain a satisfactory visual color quality when observed at different positions or through different angles. When the first colored layer 20 of the three-dimensional object 10 is observed, the object may likewise maintain a satisfactory visual color quality as per the same principle.

The side surface of the first colored layer 20 may make a surface contact with the side surface of the second colored layer 24 at the contact portion 28 on the outer side in the thickness direction, and the partition layer 26 may be disposed on the inner side in the thickness direction with respect to the contact portion 28. This may prevent exposure of the partition layer 26 that differ in color from the first colored layer 20 or the second colored layer 24, allowing the three-dimensional object 10 to maintain a satisfactory visual appearance.

Preferably, the partition layer 26 has a lower light transmittance than the first colored layer 20 and the second colored layer 24. This may increase the light-shielding effect exerted by the partition layer 26.

The partition layer 26 may be provided only where the adjacent angle θ has a degree less than the threshold θth. Greater degrees of the adjacent angle θ may be prone to the following two outcomes; longer path length of light traversing the apex vicinity of the three-dimensional object 10, and a greater range of angles through which the partition layer 26 is visible from the outside (hereinafter, visibility angle). Taking these possible outcomes into consideration, the partition layer 26 visually recognizable from the outside may be omitted, if unneeded. This may prevent that the three-dimensional object 10 is degraded in visual appearance on the contrary to expectation.

4. Modified Example

The three-dimensional object 10 is not necessarily limited to the described example. It should be understood that the object 10 may have an optional shape, color, or pattern. The partition layer 26 may be variously modified to effectively improve the light-shielding effect.

[1] For example, the partition layer 26 may have a color other than white, gray, black, and an achromatic color close to white, gray, or black. The partition layer 26 may have one of the first color and the second color. In a case where partition layer 26 having the first color is provided, the natural light 34 entering through the first colored layer 20 may be reflected from the partition layer 26 having a spectral reflectance similar to that of the second colored layer 24 and then received as the reflected component 36 containing color components of the first color in abundance. The partition layer 26 colored in the first color (or second color) may be unlikely to adversely affect color reproducibility of the first colored layer 20 (or second colored layer 24).

This may deliver a light-shielding effect that prevents perception of color components of the second colored layer 24 at the time of observing the first colored layer 20 of the three-dimensional object 10. As a result, the object 10 may maintain a satisfactory visual color quality when observed at different positions or through different angles. In a case where the partition layer 26 having the second color is provided, the three-dimensional object 10 may likewise maintain a satisfactory visual color quality as per the same principle at the time of observing the second colored layer 24 of this object.

[2] Even in a case of the adjacent angle θ greater than or equal to θth (θ≥θth), the partition layer 26 may be interposed between the side surfaces of the first colored layer 20 and the second colored layer 24. Greater adjacent angles are inclined to conduce to a greater range of visibility angles of the partition layer 26. In the light of this fact, the partition layer 26 may have a higher light transmittance with greater degrees of the adjacent angle θ. This may decrease the quantity of light reflected from the surface of the partition layer 26, consequently making the partition layer 26 barely visually recognizable from the outside of the three-dimensional object 10.

[Description of Three-Dimensional Shaping Apparatus 100]

A three-dimensional shaping apparatus 100 used to form the three-dimensional object 10 is hereinafter described referring to FIGS. 5A to 9.

1. Description of Principal Structural Elements

FIGS. 5A and 5B are schematic drawings of structural elements of the three-dimensional shaping apparatus 100 according to the embodiment. FIG. 5A is a schematic side view of the three-dimensional shaping apparatus 100. FIG. 5B is a schematic plan view of the three-dimensional shaping apparatus 100. These drawings illustrate a multi-layered structure 50 constituting the three-dimensional object 10 currently shaped.

The multilayered structure 50 includes a modeling material 52 (shaping material) that is the raw material of the three-dimensional object 10, and a support material 54 that supports the modeling material 52 from its outer or inner side. The multilayered structure 50 is formed of unit layers including the modeling material 52 and/or support material 54 and vertically stacked on one another. In the description below, the uppermost surface of the multilayered structure 50 may be referred to as "unit layer surface 56".

The three-dimensional shaping apparatus 100 includes a mounting unit 60 on which the multilayered structure 50 is to be mounted, a carriage 62 loaded with a mechanism for discharging the modeling material 52 and the support material 54, and a carriage driving unit 64 that drives the carriage 62 to move in X and Y directions.

The mounting unit 60 has a mounting table 68 with a flat work surface 66, and a stage driver 70 that drives the mounting table 68 to move in the normal direction (Z direction) of the work surface 66. The carriage driving unit 64 has a pair of guide rails 72, 72 (X bars) extending in parallel to the X direction, two sliders 74, 74 movable along the respective guide rails 72, and a carriage rail 76 (Y bar) hanging across the two sliders 74, 74 and extending in the Y direction.

The carriage 62 is attached to the carriage rail 76. The carriage 62 is movable along the carriage rail 76 or movable as a unit with the carriage rail 76 along the guide rails 72, 72. This may allow for relative movements of the carriage 62 and the mounting table 68 in the X direction, Y direction, and Z direction intersecting one another. In this embodiment, the X direction and the Y direction are coincident with the "horizontal direction", and the Z direction is coincident with the "vertical direction". These three directions are orthogonal to one another.

The carriage 62 is mounted with a discharge unit 80, a flattening roller 82, and a curing unit 84. The discharge unit 80 discharges the modeling material 52 and the support material 54 both having fluidity (hereinafter, may be collectively referred to as "droplets 78") to the work surface 66. The flattening roller 82 flattens the unit layer surface 56. The curing unit 84 cures the droplets 78 on the unit layer surface 56.

The discharge unit 80 includes discharge surfaces 86 and is located so as to have the discharge surfaces 86 face the work surface 66 or the unit layer surface 56. The discharge unit 80 has a plurality of discharge heads 88 that discharge the modeling material 52 in the same color or different colors, and one discharge head 90 that discharges the support material 54. Various techniques are available for the mechanism employed to discharge the droplets 78 from the discharge heads 88 and 90. For instance, an actuator including a piezoelectric element may be modified for the discharge of the droplets 78. The modeling material 52 or the support material 54 may be heated by a heater (heat generator) to generate air bubbles, so that the droplets 78 are discharged under the pressure of the generated air bubbles.

The discharge heads 88 and 90 have, on their discharge surfaces 86, nozzle arrays 94 each having a plurality of nozzles 92 aligned in a row in the lengthwise direction of the nozzle array (X direction in the drawing). In a case where the discharge unit 80 has six discharge heads 88, the six discharge heads 88 respectively discharge the droplets 78 of the modeling material 52 colored in cyan (C), magenta (M), yellow (Y), black (K), clear (CL), and white (W) colors, for example.

The curing unit 84 is a device that cures the droplets 78 of the modeling material 52 by applying a form of energy to the droplets 78. The curing unit 84 is operable to apply various forms of energy. When an ultraviolet-curable resin is used as the modeling material 52, the curing unit 84 is equipped with an ultraviolet light source that radiates ultraviolet light as light energy. When a thermosetting resin is used as the modeling material 52, the curing unit 84 is equipped with a heating device that applies heat energy, and, if necessary, a cooling device for cooling the multilayered structure 50.

Examples of the ultraviolet light source may include rare gas discharge lamps, mercury discharge lamps, fluorescent lamps, and LED (light emitting diode) arrays. The support material 54 may be selected from materials that can be removed without altering the properties of the three-dimensional object 10, examples of which may include water-swelling gels, waxes, thermoplastic resins, water-soluble materials, and soluble materials.

2. Block Diagram

Figure 6:
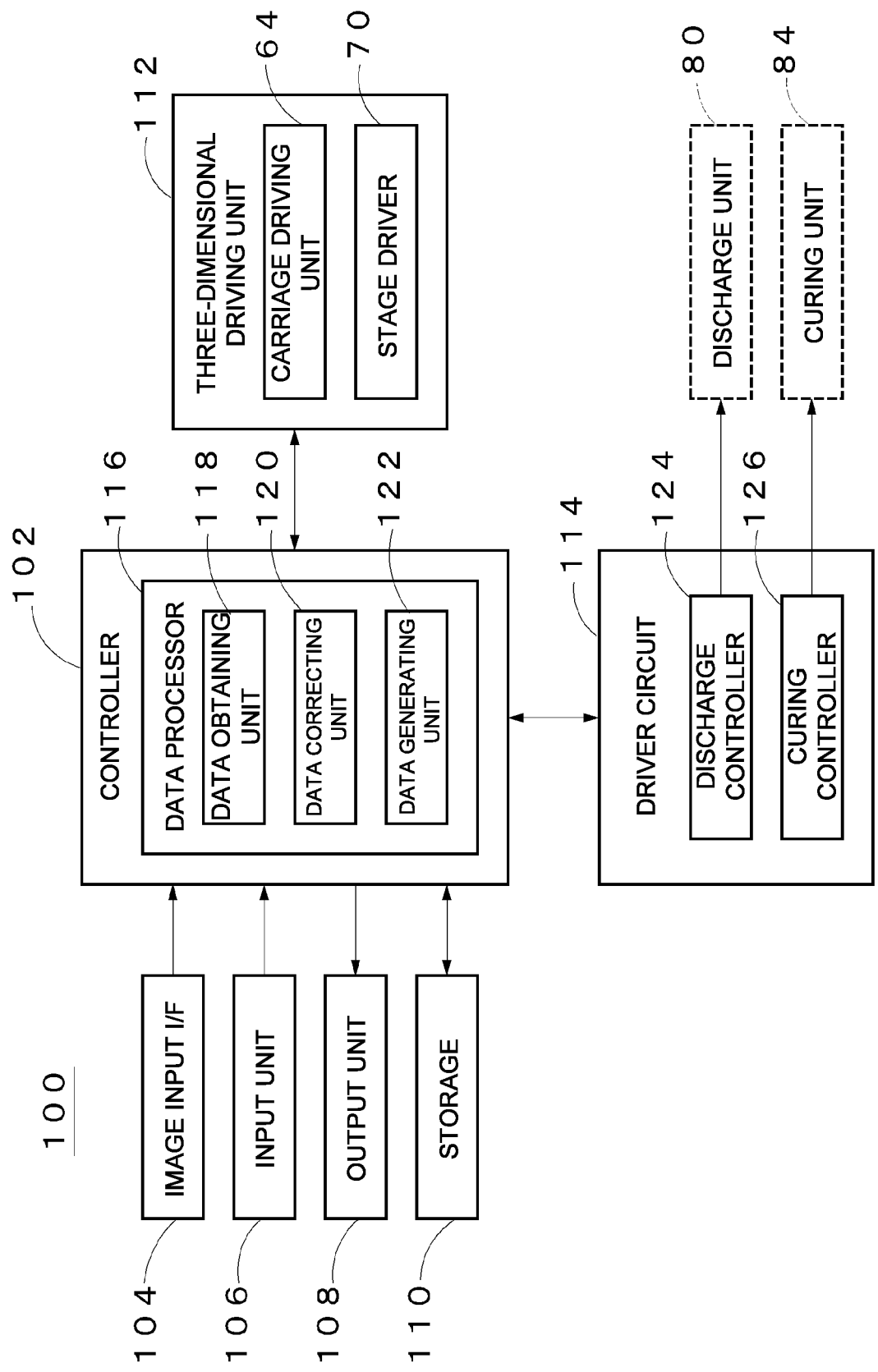
FIG. 6 is a block diagram of the apparatus illustrated in FIG. 5A and FIG. 5B.
Figure 7:
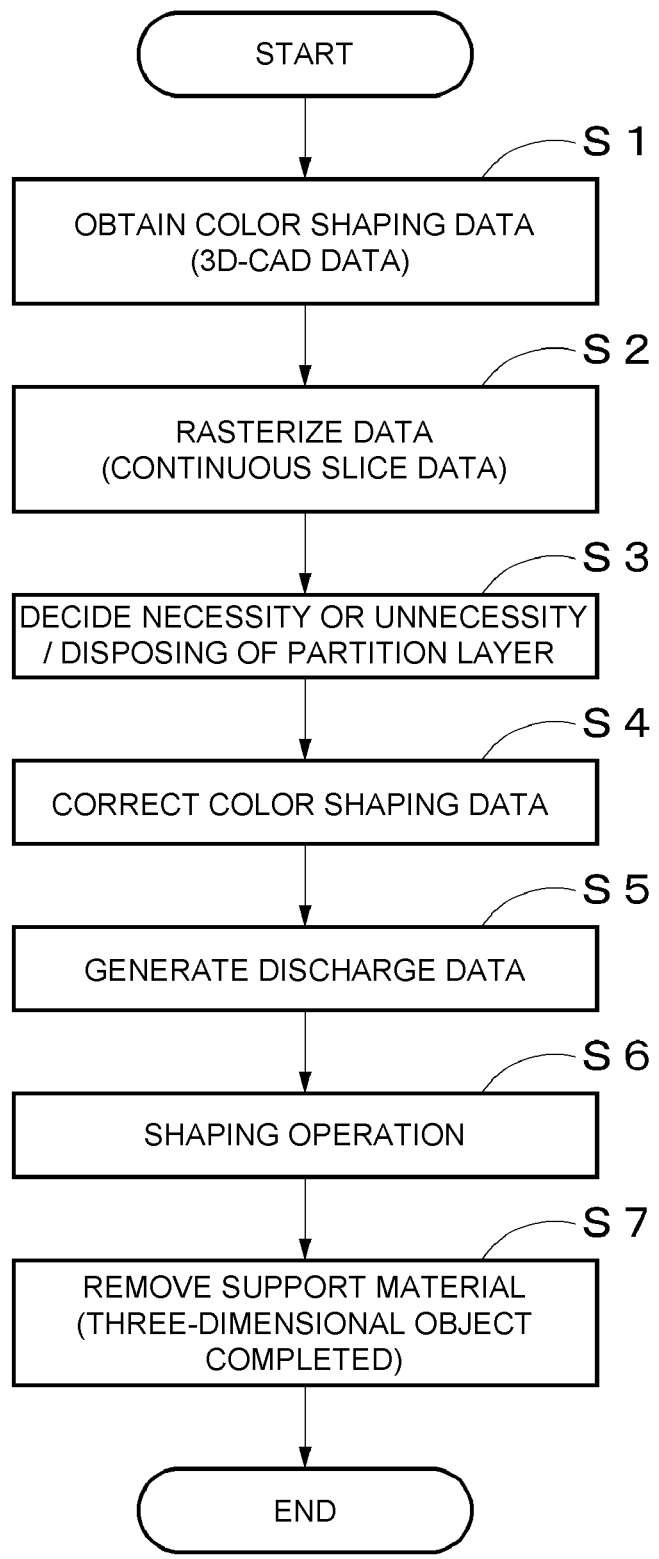
FIG. 7 is an operational flow chart of the three-dimensional shaping apparatus illustrated in FIG. 5A and FIG. 5B.

FIG. 6 is a block diagram of the three-dimensional shaping apparatus 100 according to the embodiment. The three-dimensional shaping apparatus 100 includes, in addition to the carriage driving unit 64, stage driver 70, discharge unit 80, and curing unit 84 illustrated in FIGS. 5A and 5B, a controller 102, an image input I/F 104, an input unit 106, an output unit 108, a storage 110, a three-dimensional driving unit 112, and a driver circuit 114.

The image input I/F 104 includes a serial I/F, a parallel I/F, a USB I/F, or an Ethernet (registered trademark) I/F. The image input I/F 104 receives electric signals containing image information representing the three-dimensional object 10 from an external apparatus not illustrated in the drawing. The input unit 106 includes a mouse, a keyboard, a touch sensor and/or a microphone. The output unit 108 includes a display and/or a speaker.

The storage 110 is a non-transitory storage and includes a computer-readable storage medium. Examples of the computer-readable storage medium may include transportable media, for example, magneto-optical discs, ROM, CD-ROM, flash memories, and storage devices such as a hard disc mounted in a computer system. The storage medium used may be configured to dynamically store programs for a brief period of time or store programs for a certain period of time.

The three-dimensional driving unit 112, by driving at least one of the mounting table 68 and the discharge unit 80, three-dimensionally moves the discharge unit 80 relative to the mounting table 68. In this embodiment, the three-dimensional driving unit 112 includes the carriage driving unit 64 that drives the discharge unit 80 to move in the X and Y directions, and the stage driver 70 that drives the mounting table 68 to move in the Z direction.

The controller 102 is a computing device in charge of controlling the structural elements of the three-dimensional shaping apparatus 100. The controller 102 includes a CPU (central processing unit), a GPU (graphics processing unit) or a MPU (micro-processing unit), for example. The controller 102 reads and executes the programs stored in the storage 110 to effectuate various functions, including a data processor 116 that applies desired image processes to color shaping data representing features of the three-dimensional object 10.

The data processor 116 includes a data obtaining unit 118 that obtains color shaping data 150 (FIGS. 9A and 9B) using the image input I/F 104, a data correcting unit 120 that corrects the color shaping data 150, and a data generating unit 122 that generates intermediate data indicating whether the droplets 78 have been discharged and positions at which they have been discharged (hereinafter, referred to as discharge data).

The driver circuit 114 is an electric circuit electrically connected to the controller 102. The driver circuit 114 drives the respective units and devices to carry out a shaping operation. In this embodiment, the driver circuit 114 includes a discharge controller 124 for discharge control of the discharge unit 80, and a curing controller 126 for curing control of the curing unit 84.

The discharge controller 124 generates drive waveform signals for actuators of the discharge heads 88 and 90 based on the discharge data supplied from the controller 102, and outputs the waveform signals to the discharge unit 80. The curing controller 126 generates drive signals for the various energies to be applied, and outputs the drive signals to the curing unit 84.

3. Operation of Three-Dimensional Shaping Apparatus 100

The three-dimensional shaping apparatus 100 according to this embodiment is structured as described thus far. Next, the operation of the three-dimensional shaping apparatus 100 is described referring to the flow chart of FIG. 7, and FIGS. 8, 9A and 9B.

In Step S1, the controller 102 (data obtaining unit 118) obtains the color shaping data including 3D-CAD (computer aided design) data using the image input I/F 104. The color shaping data represents an original colored object having the same external appearance as the three-dimensional object 10. In a case of a wire-frame model, the color shaping data is a combination of shape model data representing the three-dimensional frame of the three-dimensional object 10 and surface image data representing images on the outermost surfaces 12 and 14. The wire frame model is a non-limiting example of 3D visual presentations of the color shaping data. Instead, the surface model or solid model may be employed.

In Step S2, the data generating unit 122 rasterizes the color shaping data in the vector data format obtained in Step S1. Prior to the process in this step, the data generating unit 122 determines intra-frame colors (for example, white) and superimposes surface images on surfaces within the frames using the known texture mapping. Then, the data generating unit 122 converts the original data into raster data suitable for three-dimensional resolutions in the X, Y, and Z directions. Based on the premise that rendering of data, even with changes in data format, has a substantially equivalent outcome, the converted data is hereinafter referred to as the "color shaping data" as before.

In Step S3, the controller 102 (data correcting unit 120) analyzes the color shaping data obtained in Step S1 to decide on necessity or unnecessity of the partition layer 26 and where to be positioned if necessary. Specifically, the data correcting unit 120 executes geometrical computations using frame information (apexes and which ones of the apexes are connected) contained in the shape model data to calculate the adjacent angles θ between the outermost surfaces 12 and 14. The data correcting unit 120 further analyzes pixel values of the surface image data to obtain the colors of the outermost surfaces 12 and 14.

Figure 8:
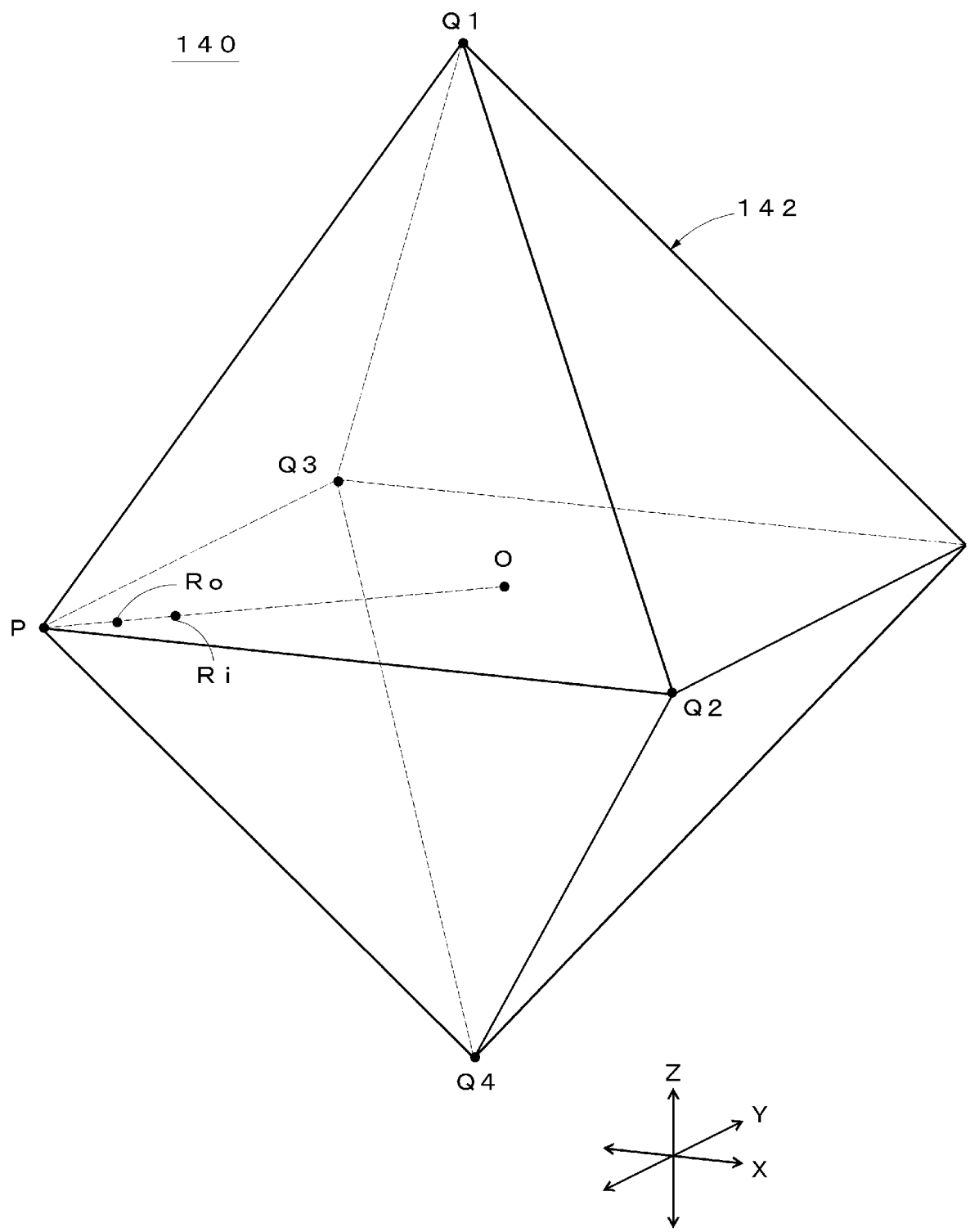
FIG. 8 is a schematic drawing, illustrating how to decide the position of a partition layer.

FIG. 8 is a schematic drawing, illustrating how to decide the position of the partition layer 26. This drawing illustrates a virtual object 142 rendered based on the color shaping data 150 (FIGS. 9A and 9B) in a predefined three-dimensional work region 140. As described earlier referring to FIG. 3, the adjacent angle θ between the plane Q1PQ2 constituting the outermost surface 12 and the plane Q1PQ3 constituting the outermost surface 14 is 90 degrees (θ=90 degrees). It is accordingly decided that the partition layer 26 is disposed in vicinity of sides PQ1 and PQ4.

Importantly, the partition layer 26 is disposed with a line segment OP partly included therein, where "O" refers to the center of gravity of the virtual object 142. An outer endpoint Ro is a point on the line segment OP more inward than an apex P by a certain distance (depth from the ridge 30). An inner endpoint Ri is a point on the line segment OP more inward than the outer endpoint Ro by a certain distance (width of the partition layer 26).

The data correcting unit 120 executes similar computations for any other apexes but the apex P and identifies the outer endpoints Ro and inner endpoints Ri in relation to these apexes. Then, the adjacent outer endpoints Ro or the adjacent inner endpoints Ri are successively connected to decide a region where the partition layer 26 of FIG. 3 should be disposed.

In Step S4, the data correcting unit 120 corrects the color shaping data 150 rasterized in Step S2, and disposes the partition layer 26 in accordance with the decision made in Step S3. This method of correction is hereinafter described in detail referring to FIGS. 9A and 9B.

Figure 9A:
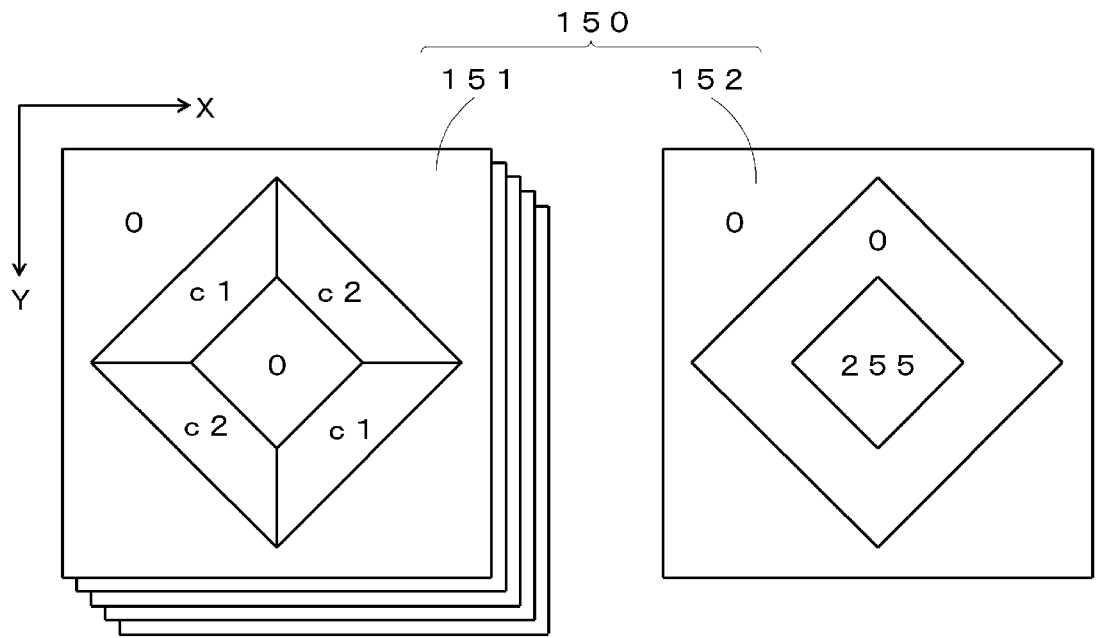
FIGS. 9A and 9B are schematic drawings, illustrating how to correct color shaping data.

FIG. 9A is a drawing of pixel values constituting the color shaping data 150 yet to be corrected, substantially corresponding to the rendering illustrated in FIG. 4A. This drawing illustrates, on its left side, continuous slice data 151 having the color channel of C (cyan). In this drawing, numbers in squares representing image regions are pixel values (8-bit gradation); "255" represents the highest gradation, and "0" represents the lowest gradation.

As is understood from the rendering of the continuous slice data 151, the pixel value corresponding to the first colored layer 20 is "c1" (first color), and the pixel value corresponding to the second colored layer 24 is "c2" (second color). The pixel value corresponding to the shaping base 16 is "0" (achromatic color), and the pixel value corresponding to the margin is "0" (colorless).

This drawing illustrates, on its right side, continuous slice data 152 having the color channel of W (white). As is understood from the rendering of this data, the pixel value corresponding to the first colored layer 20 is "0" (first color), and the pixel value corresponding to the second colored layer 24 is "0" (second color). The pixel value corresponding to the shaping base 16 is "255" (achromatic color), and the pixel value corresponding to the margin is "0" (colorless).

The data correcting unit 120 updates the continuous slice data 151 by overwriting the pixel values "c1" and "c2" corresponding to the partition layer 26 with "0" and "0", respectively. The data correcting unit 120 further updates the continuous slice data 152 by overwriting the pixel value "0" corresponding to the partition layer 26 with "255".

Figure 9B:
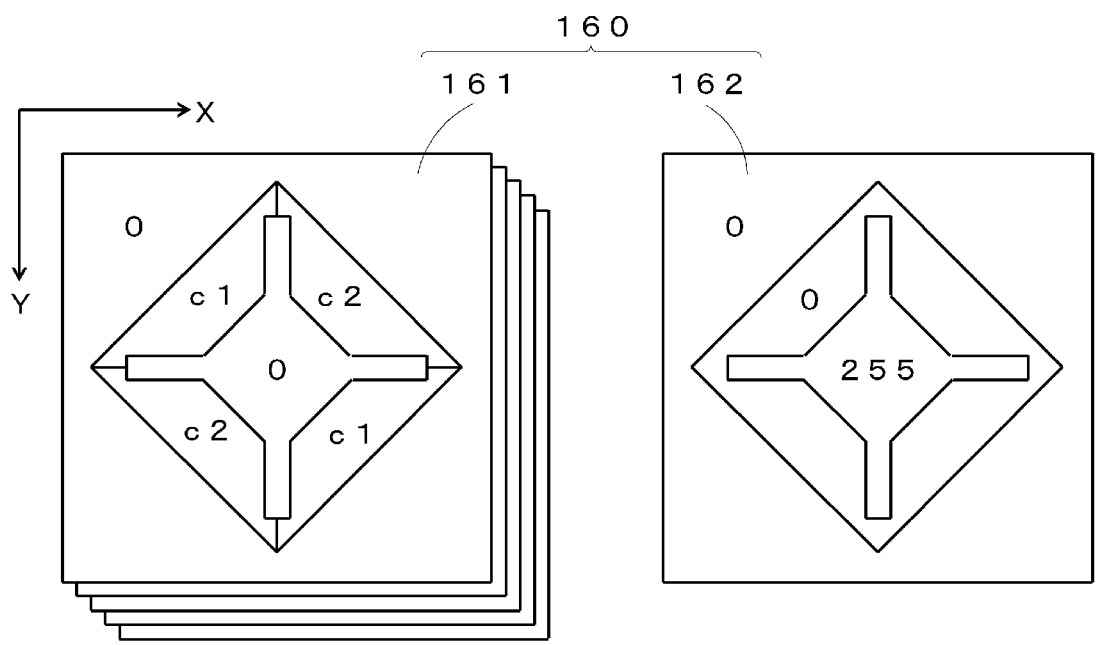

FIG. 9B is a drawing of pixel values constituting the color shaping data 150 that has been corrected, that is, corrected shaping data 160, substantially corresponding to the rendering illustrated in FIG. 4B. This drawing illustrates, on its left side, continuous slice data 161 having the color channel of C (cyan), and continuous slice data 162 having the color channel of W (white).

In Step S5, the data generating unit 122 applies various image processes to the corrected shaping data 160 obtained in Step S4 to generate discharge data for use in the discharge control for the droplets 78. The image processes may include halftone process including dithering, related color/different color plate division, dot size (droplet volume) layout, and process to constrain the number of droplets discharged, for example.

In Step S6, the three-dimensional shaping apparatus 100 carries out the shaping operation based on the discharge data generated in Step S5. Specifically, the three-dimensional shaping apparatus 100, while three-dimensionally moving the mounting table 68 and the discharge unit 80 relative to each other, sequentially stacks the unit layers including the modeling material 52 and the support material 54 along the Z direction. The apparatus 100 successively performs [1] discharge of the droplets 78 from the discharge unit 80, [2] flattening of the unit layer surfaces 56 using the flattening roller 82, and [3] curing of the droplets 78 using the curing unit 84 for [4] growth of the multilayered structure 50, to complete the production of the multilayered structure 50 as an intermediate shaped object.

In Step S7, the support material 54 is removed from the intermediate shaped object obtained in Step S6. Then, the three-dimensional object 10 illustrated in FIG. 1 is finally obtained. The support material 54 may be removed through a physical treatment or a chemical treatment suitable for the properties of the support material 54. Examples of the treatment may include dissolving using water, heating, chemical reactions, washing under water pressure, and irradiation of electromagnetic wave.

4. Effects Attained by Three-Dimensional Shaping Apparatus 100

As described so far, the three-dimensional shaping apparatus 100 vertically stacks the unit layers on one another that include a plurality of different modeling materials 52 that enable color reproduction of at least the first color and the second color to shape the three-dimensional object 10. The three-dimensional object 10 shaped includes: the shaping base 16 having the first outer surface(s) 18 and the second outer surface(s) 22 adjacent to each other at the adjacent angle θ; the first colored layer(s) 20 formed on the first outer surface(s) 18 of the shaping base 16 and including a transparent material colored in the first color, and the second colored layer(s) 24 formed on the second outer surface(s) 22 of the shaping base 16 and including a transparent material colored in the second color.

The three-dimensional shaping apparatus 100 has the data obtaining unit 118 and the data correcting unit 120. The data obtaining unit 118 obtains the color shaping data 150 representing the original colored object including the shaping base 16, first colored layer(s) 20, and second colored layer(s) 24. The data correcting unit 120 corrects the obtained color shaping data 150 to interpose the opaque partition layer 26 between the side surfaces of the first and second colored layers 20 and 24 in the original colored object. The partition layer 26 has one of the first color, the second color, and an achromatic color with zero saturation or very low saturation.

The three-dimensional shaping method using the three-dimensional shaping apparatus 100 includes the obtaining step (S1) of obtaining the color shaping data 150 representing the original colored object, and the correcting step (S4) of correcting the obtained color shaping data 150. These technical features may allow the shaped three-dimensional object 10 (FIGS. 1 to 4B) to maintain a satisfactory visual color quality when observed at different positions or through different angles.

ADDITIONAL REMARKS

This disclosure is not confined to the embodiment and the modified embodiment described thus far. It should be understood that this disclosure may be unlimitedly subject to any changes within the scope of the contents of this disclosure.

For example, the three-dimensional shaping apparatus 100 may be operable to set layout information on the partition layer 26. In this instance, the controller 102 obtains the layout information as instructed by an operator's manipulation of the input unit 106, and generates the corrected shaping data 160 based on the obtained layout information. This layout information contains specifics of the partition layer 26 (for example, thickness, width, position, color) and/or criteria on whether the partition layer 26 should be provided (for example, threshold θth, necessity or unnecessity of the partition layer 26).

In this embodiment, the data correcting unit 120 corrects the color shaping data 150 converted into the format of raster data. This is, however, a non-limiting example of the data correction timing. For example, the multi-gradation data may be corrected subsequent to the halftone process, or the vector data may be corrected prior to the rasterizing process.

In this embodiment, the mounting table 68 and the discharge unit 80 may be both movable members. Instead, one of the mounting table 68 and the discharge unit 80 may be moved, with the other being immovably fixed. Further, the three directions of movement (X direction, Y direction, Z direction) may be optionally combined.

This embodiment has described the three-dimensional shaping apparatus 100 of inkjet type. This is, however, a non-limiting example of this disclosure. This shaping apparatus may be further applicable to fused deposition modeling, stereolithography, selective laser sintering, projection, and inkjet binder jetting.

What is claimed is:

1. A three-dimensional object comprising:
    a shaping base having a first outer surface and a second outer surface adjacent to each other at an adjacent angle;
    a first colored layer formed on the first outer surface of the shaping base, the first colored layer including a transparent material colored in a first color;
    a second colored layer formed on the second outer surface of the shaping base, the second colored layer including a transparent material colored in a second color different from the first color; and
    a partition layer interposed between a side surface of the first colored layer and a side surface of the second colored layer, the partition layer being opaque and having one of the first color, the second color, and an achromatic color,
    wherein the partition layer has a lower light transmittance than the first colored layer and the second colored layer, and the partition layer is formed along a region where the first colored layer and the second colored layer are in surface contact,
    wherein a natural light incident from an outside of the first colored layer or the second colored layer is shielded from transmission to an opposite side with respect to the partition layer and reflected.

2. The three-dimensional object according to claim 1, wherein the partition layer is disposed on an inner side in the thickness direction with respect to the contact portion.

3. The three-dimensional object according to claim 1, wherein the partition layer has a higher light transmittance as the adjacent angle has a greater degree.

4. The three-dimensional object according to claim 2, wherein the partition layer has a higher light transmittance as the adjacent angle has a greater degree.

5. The three-dimensional object according to claim 1, wherein the partition layer is provided only where the adjacent angle has a degree less than a threshold.

6. The three-dimensional object according to claim 2, wherein the partition layer is provided only where the adjacent angle has a degree less than a threshold.

7. The three-dimensional object according to claim 1, wherein the first outer surface and the second outer surface have an opaque achromatic color.

8. The three-dimensional object according to claim 2, wherein the first outer surface and the second outer surface have an opaque achromatic color.

9. The three-dimensional object according to claim 5, wherein the first outer surface and the second outer surface have an opaque achromatic color.

10. The three-dimensional object according to claim 7, wherein the first outer surface and the second outer surface have an opaque achromatic color.

11. The three-dimensional object according to claim 1, wherein the partition layer has an achromatic color close to white, gray, or has one of the first color and the second color.

* * * * *